United States Patent [19]

Bozman

[11] Patent Number: 4,947,319
[45] Date of Patent: Aug. 7, 1990

[54] ARBITRAL DYNAMIC CACHE USING PROCESSOR STORAGE

[75] Inventor: Gerald P. Bozman, Oakland, N.J.
[73] Assignee: International Business Machines Corporation, Armonk, N.Y.
[21] Appl. No.: 244,976
[22] Filed: Sep. 15, 1988
[51] Int. Cl.$^5$ .................. G06F 12/00; G06F 13/00
[52] U.S. Cl. ........................ 364/200; 364/243.4; 364/243.41; 364/964.2
[58] Field of Search ............ 364/200, 900, 300

[56] References Cited

U.S. PATENT DOCUMENTS

| | | | |
|---|---|---|---|
| 4,315,312 | 2/1982 | Schmidt | 364/200 |
| 4,422,145 | 12/1983 | Sacco et al. | 364/200 |
| 4,430,712 | 2/1984 | Coulson et al. | 364/200 |
| 4,463,424 | 7/1984 | Mattson et al. | 364/300 |
| 4,489,378 | 12/1984 | Dixon et al. | 364/200 |
| 4,503,501 | 3/1985 | Coulson et al. | 364/200 |
| 4,654,782 | 3/1987 | Bannai et al. | 364/200 |

OTHER PUBLICATIONS

Effects of Cache Coherency in Multiprocessors—Michel Dubois & Faye A. Briggs.

Primary Examiner—Gareth D. Shaw
Assistant Examiner—Gopal C. Ray
Attorney, Agent, or Firm—Ronald L. Drumheller

[57] ABSTRACT

A data cache in a computer operating system that dynamically adapts its size in response to competing demands for processor storage, and exploits the storage cooperatively with other operating system components. An arbiter is used to determine the appropriate size of the cache based upon competing demands for memory. The arbiter is entered cyclically and samples user's wait states. The arbiter then makes a decision to decrease or increase the size of the cache in accordance with predetermined parameters.

9 Claims, 7 Drawing Sheets

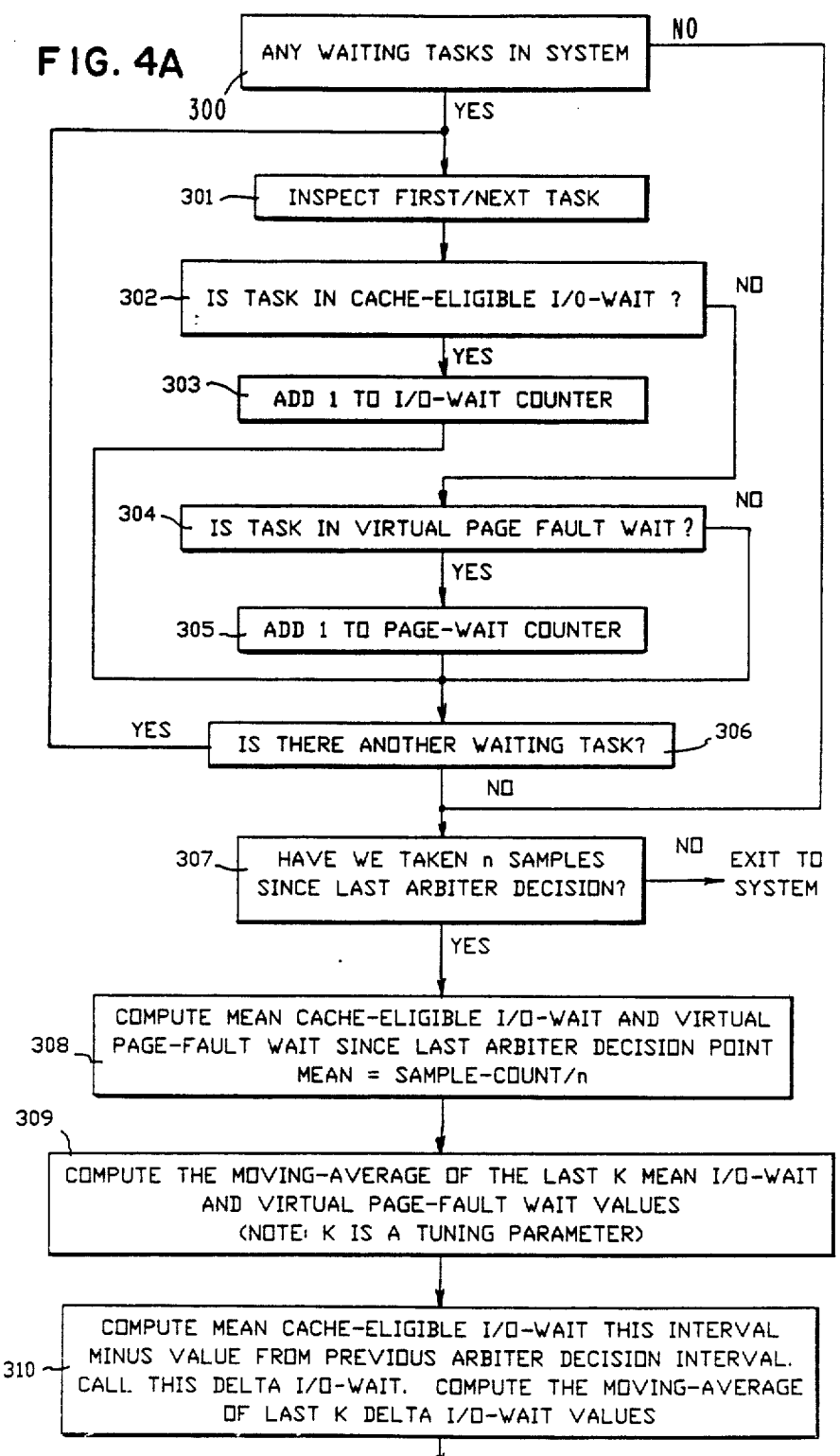

ARBITRAL DYNAMIC CACHE USING PROCESSOR STORAGE

BACKGROUND OF THE INVENTION

I. Field of the Invention

The present invention relates generally to the field of computers and specifically to a dynamic cache used in computers.

II. Description of the Prior Art

Data caches are known in the art and used in a wide variety of computers to enhance operation. The present invention describes a cache useful in enhancing I/0 operation, primarily with direct access storage devices (DASD) commonly known as disks.

Such a cache uses a portion of main storage or memory to act as a buffer containing often used portions of a data file residing on a disk. Since access to main storage, (generally solid state RAM) tends to be considerably faster than access to disk (a mechanical device) execution of various file I/0 can be greatly enhanced by bringing data likely to be needed by the processor into memory before it actually needed by the processor.

A data cache can do this by inserting a set of buffers between the operating system and the disk. The data cache program maintains this set of buffers and manages the buffers so that if the data is in the buffer when a request is made to the disk the request is satisfied from one of the buffers and not from the disk. This results in significantly faster disk accesses.

The buffers are maintained such that when a request is made to the disk and the data is not in one of the buffers, the data is read into one (or more) of the buffers before the request returns to the operating system. This allows the cache to get new data that is being accessed. The cache must also maintain the buffers so that "older" less often referenced data can be replaced with "newer" potentially more often referenced data. The cache does this by maintaining a list or directory of all the buffers. The list is maintained so that the more often used buffers are near one end of the list and the less often used buffers are near the other end. If the cache needs a buffer (for new data) it gets one from the end of the list that has the less often used buffers. This is called an LRU (Least Recently Used) list, and while other methods for bringing data into the cache may be used LRU algorithms are the most widely used.

In the prior art, data caches that exploit processor memory have been static in size and do not adapt to competing demands for the storage resource. Also, they only exploit main, or at best virtual memory.

Accordingly, it is an object of the invention to provide a data cache that is not static in size.

It is a further object of the invention to provide a data cache that dynamically adapts its size in response to competing demands for processor storage so as to optimize system throughput.

It is still another object of the invention to provide a data cache that exploits either or both of real or expanded storage cooperatively with other operation system components.

These, and other, objects, advantages, and features of the invention will be more apparent upon reference to the description and the appended drawings.

SUMMARY OF THE INVENTION

In accordance with a preferred but nonetheless illustrative embodiment demonstrating objects and features of the present invention there is provided a data cache in a computer operating system that dynamically adapts its size in response to competing demands for processor storage, and exploits the storage cooperatively with other operating system components. An arbiter is used to determine the appropriate size of the cache based upon competing demands for memory. The arbiter is entered cyclically and samples user's wait states. The arbiter then makes a decision to decrease or increase the size of the cache in accordance with predetermined parameters.

BRIEF DESCRIPTION OF THE DRAWINGS

FIGS. 4A, 4B and 5 are detailed flow diagrams illustrating the operation of the ARBITER component.

DESCRIPTION OF THE PREFERRED EMBODIMENTS

Figure 1:
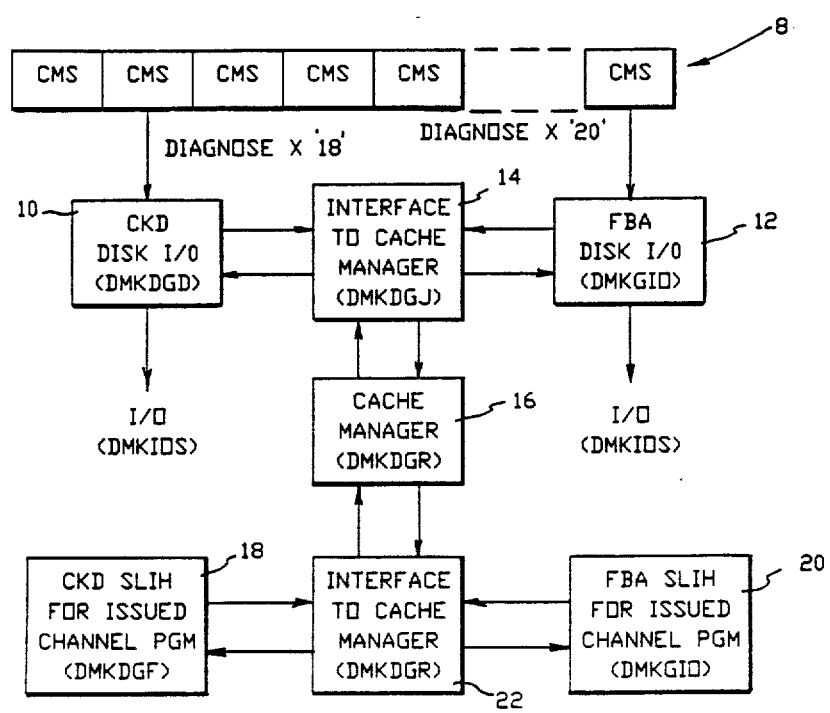
FIG. 1 shows the placement and relation of a data cache to other elements of a computer operating system.

In present multiuser computer systems a store-through data cache is referenced on reads via the operating systems I/0 channel program. Read misses and writes are inserted into the cache via the I/0 channel program, in the second level interrupt handler (SLIH). In the IBM VM operating system this would be done in the diagnose I/0 handler and its associated SLIH to support a CMS data cache. FIG. 1 shows the placement of a data cache in VM/SP to enhance the performance of CMS virtual machines. The details vary for other versions of VM (e.g., VM/XA), but the basic structure is similar.

In FIG. 1 the READ channel programs issued by CMS 8 to Count Key Data (CKD) and Fixed Block Architecture (FBA) DASD are used to interrogate the cache. DMKDGD 10 and DMKGIO 12 are the VM/SP modules that service CMS I/0 issued by means of the diagnose instruction. A new module, DMKDGJ 14, interprets the channel programs and builds a parameter list for the cache manager, DMKDGC 16. If all blocks are in the cache, the diagnose is synchronous and all blocks are copied to the user's buffer. If there is a cache miss normal asynchronous processing is used. After the I/0 is complete new blocks are updated or inserted into the cache. This is accomplished by having the respective CKD and FBA Second Level Interrupt Handler(s) (SLIH), DMKDGF 18 and DMKGIO 20, interface with a new module, DMKDGR 22, which builds a parameter list for DMKDGC 16

Figures 2, 2A:
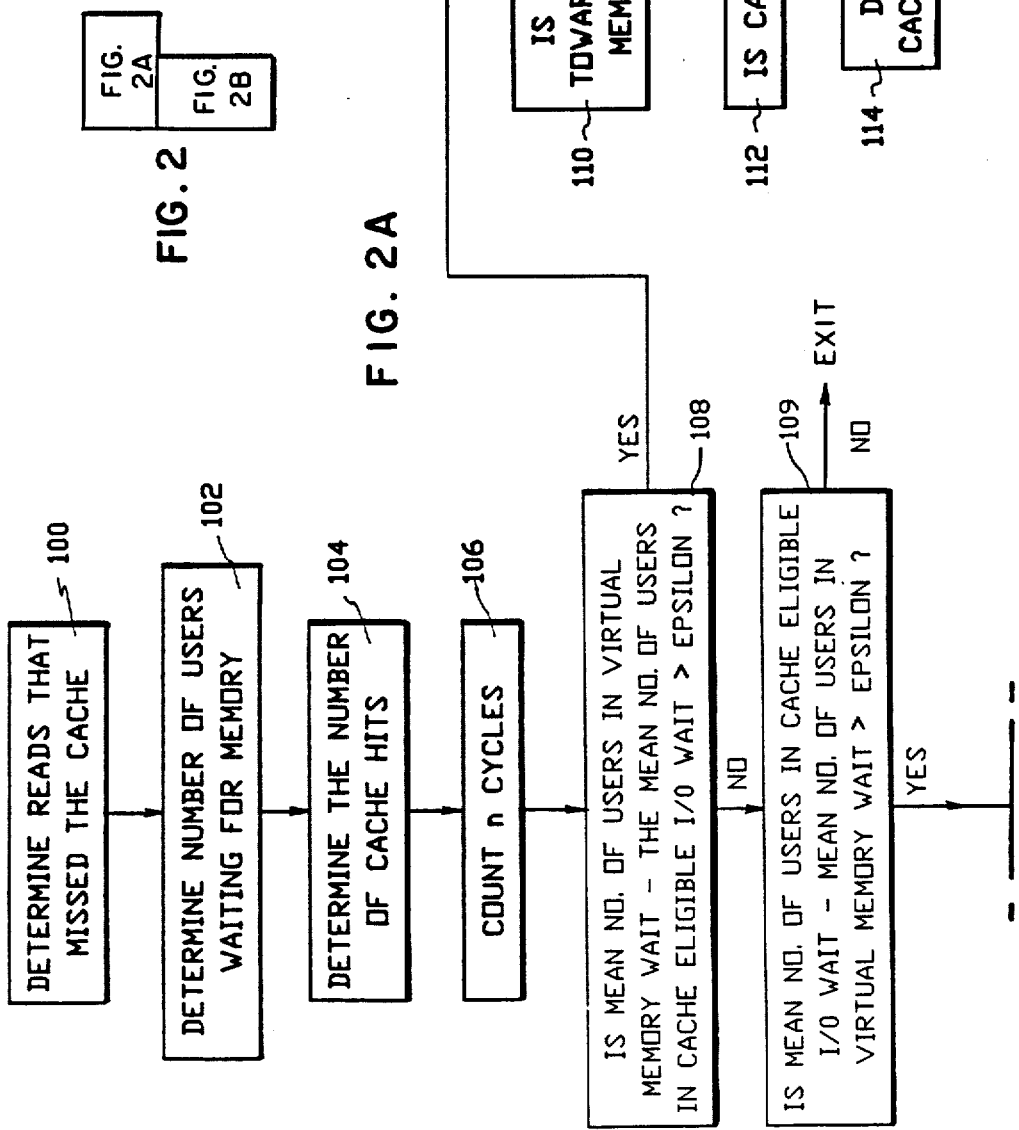
FIGS. 2, 2A and 2B are flow diagrams of the present invention.
Figure 2B:
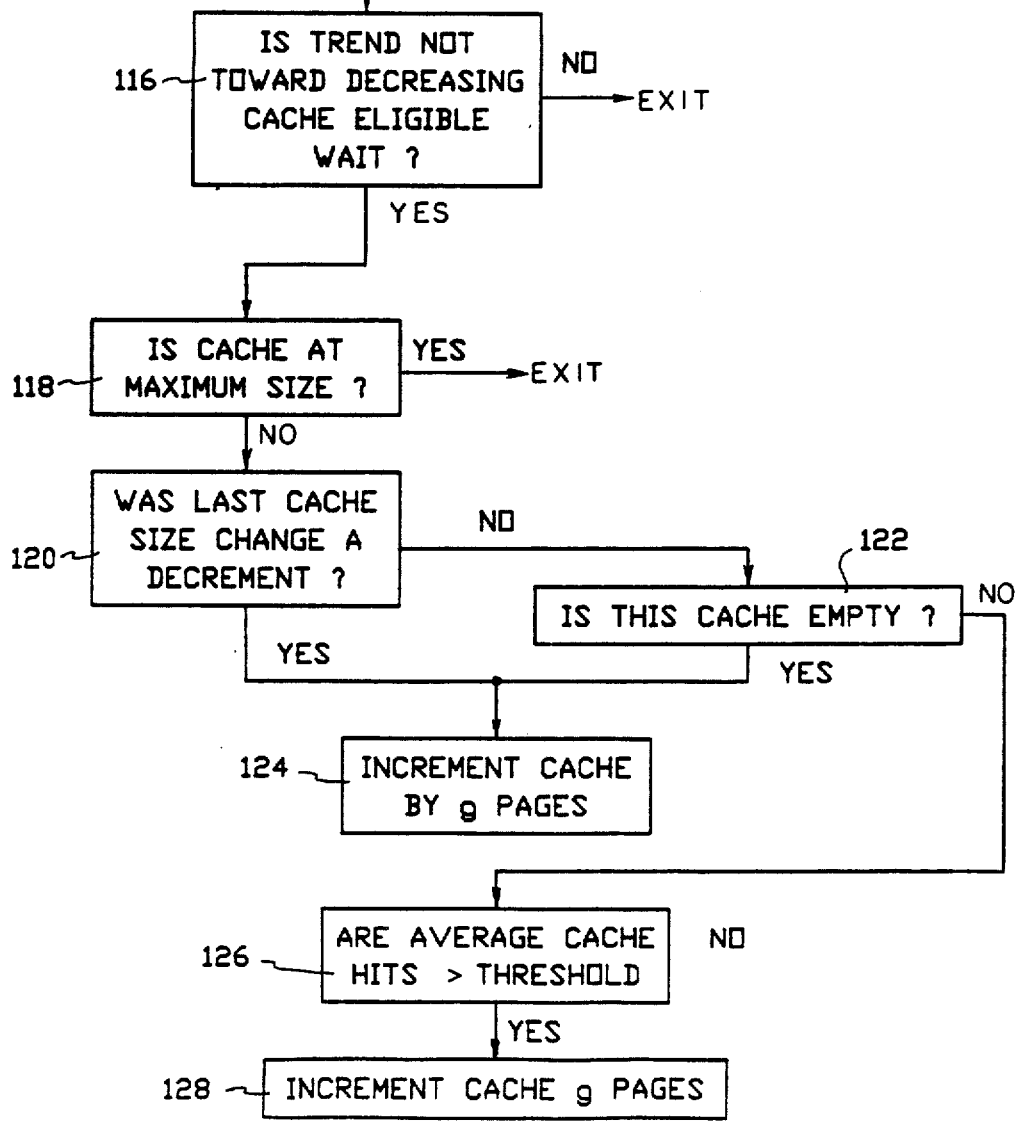

The present invention is now described with respect to FIGS. 2 et seq. During system initialization a determination is made as to whether the cache will use real or expanded storage, the maximum size that the cache will be allowed to attain, and a fraction of the maximum size, g, that is the number of pages by which the cache will be increased or decreased at a decision point. The value g should be chosen so that it is a reasonable fraction of the maximum allowable cache size but not so large that there is insufficient granularity for achieving an equilibrium between the demands for virtual memory and cache pages. Values of g that are in the range of 5% to 10% of the maximum allowable size have been found to work well.

Immediately after system initialization, the cache is empty. The present invention, unlike the prior art, uses an arbiter to determine the appropriate size of the cache based on competing demands for memory resource.

The specific algorithm used by the arbiter may vary depending upon the operating system in which it is used. It will be described herein, however, with respect to the IBM VM operating system. In VM, the arbiter is entered cyclically, and samples users wait states. Specifically, it determines:

1. The number of users in cache eligible I/O wait state, i.e. those reads that missed the cache (step 100).
2. The number of users waiting for memory (step 102) In VM, this is non-spool page wait and for a main memory cache, eligible list occupancy.
3. The number of cache hits (step 104).

The arbiter runs cyclically and makes a decision every n cycles. The cycle interval and the value n are chosen such that a statistically significant number of samples are obtained within an interval that is short enough to allow reasonable responsiveness to changing load.

In order to avoid making a decision when there is no substantial difference in the sample values, the arbiter uses a value $\epsilon$ to minimize unnecessary cache size oscillation. The value of $\epsilon$ is a function of the average number users waiting for a resource (e.g., I/O or virtual memory) and consequently of the machine size. This value can be set at system initialization or dynamically adjusted as the system is running. For example if there are on average 20 waiting users at any instant in time, a difference of 1 in the sample values may be considered insignificant. On the other hand, in a smaller system (or a larger system under low load) with only 4 waiting users, a difference of 1 is significant.

After every n cycles (step 106) the arbiter makes a decision to increase or decrease the size of the cache as follows:

If, during the last n cycles the mean number of users waiting for memory exceeds the mean number of users in cache eligible I/O wait by more than $\epsilon$(step 108), and the trend is not toward decreasing memory wait (step 110), then if the cache is not empty (step 112), it is decremented by g pages (step 114). The decrement is done synchronously, i.e., g pages are returned instantly from the bottom of the LRU stack, where $\epsilon$ is chosen to minimize oscillation. The trend test considers possible delayed effect of a previous cache decrement or the existence of a transient. If, however, either the trend is toward decreasing memory wait at step 110 or the cache is determined to be empty at 112 the routine is exited.

Otherwise, if during the last n cycles, the mean number of users in cache eligible I/O wait state exceeds the mean number of users waiting for memory by more than $\epsilon$, 109 and the trend is not toward decreasing cache eligible I/O wait (step 116) and the cache is not at its maximum size (step 118) then:

1. If the last cache size change was a decrement (step 120) or the cache is empty (122), the cache is incremented by g pages (124). The increment is actually an increase in the currently authorized size of the cache. While the authorized size exceeds the current size, the cache manager, for inserts, will request pages from the appropriate operating system memory management service instead of using the bottom of its LRU stack.

2. Otherwise (if the last cache size change was an increment) if the average cache hits per time unit since the cache was last incremented exceeds by some threshold percent the same average for the previous increment interval (step 126) then the cache is incremented by g pages (step 128). This test is done to be sure that the system is receiving continued benefit from the cache. If the average cache hits are not greater than the threshold then the routine is exited.

If at step 109 the number of users in cache eligible I/O wait does not exceed the number of users in virtual memory wait by more the $\epsilon$ or if the trend at 116 is towards decreasing I/O cache eligible wait then the routine is exited.

Additionally, the operating system memory resource managers can request the return of any amount of cache pages if it is needed due to transient demand.

The arbitral dynamic data cache according to the present invention is now described in an implementation using IBM expanded storage. Such expanded storage is a high-speed page-addressable electronic storage (RAM) accessible via synchronous input/output instructions in an attached CPU. Expanded storage is designed to be used by the operating system for storing virtual memory pages that exceed the capacity of primary memory and as a data cache. It is also intended for diverse uses by application programs to, for example, store recovery logs and large arrays of data.

Expanded storage is addressed by its ordinal page address. It is moved into and out of byte addressable primary memory by means of two synchronous instructions PGIN (page in) and PGOUT (page out). Since expanded storage is page addressable it can be thought of as a pool of 4096-byte pages.

This invention automatically and dynamically optimizes the utilization of the subset of the expanded storage that has been allocated for use by the operating system. Although described here in terms of expanded storage, a very similar technique can be used to manage primary memory when there are competing demands between virtual memory and a data cache.

Figure 3:
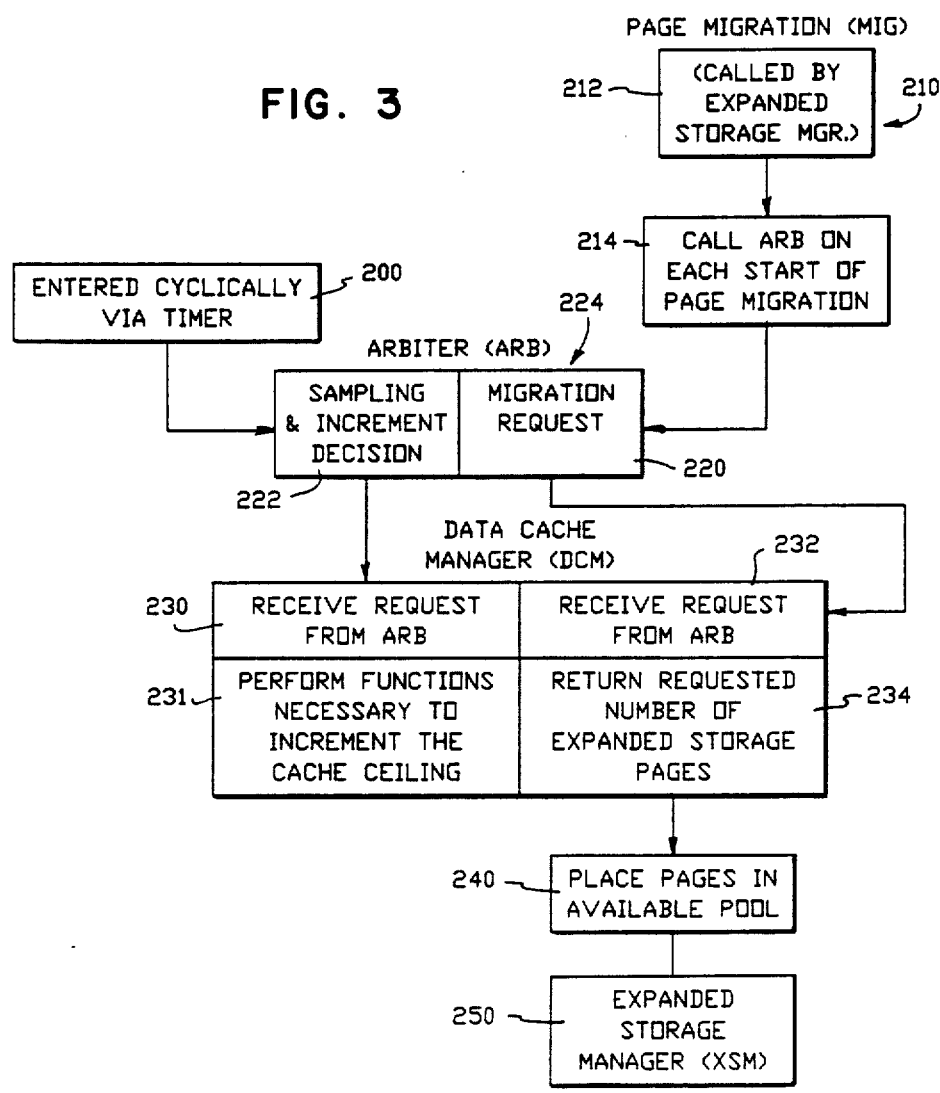
FIG. 3 is a diagram showing the relationship of the ARBITER component to other operating system software components.

FIG. 3 shows the operating system components that relate to the invention. The Page Migration Program (MIG) 210 is called by the Expanded Storage Manager (XSM) 250 when its pool of available expanded storage pages has reached some low threshold. The job of MIG 210 is to bring the available pool of memory back up to some high threshold. The number of pages required to do this is called the MIG goal. These pages can be either released by (1) the Data Cache Manager (DCM) 230 or (2) MIG 210 can move (migrate) virtual memory pages from expanded storage to a slower memory in the storage hierarchy (typically to Direct Access Storage Devices (DASD)) or (3) both DCM 230 and MIG 210 can contribute to the MIG goal.

The Arbiter (ARB) 220 is the new component introduced to decide which of these three choices is appropriate to satisfy the MIG goal. In addition, ARB 220 decides cyclically whether to increase the amount of expanded storage that can be used by DCM 230. This amount is called the data cache ceiling.

FIG. 3 shows how ARB 220 interrelates with the other operating system components in order to accomplish its task. It is entered cyclically (i.e., started up by a timer process) to sample the system performance state and decide whether based on this state the data cache ceiling should be increased. This is shown at 200. If the data cache is to be increased as determined at 222, ARB 220 calls DCM 230 to effect this change at 231 and 233. ARB 220 is also called when MIG 210 has been invoked to determine which part, if any, of the MIG goal will be met by DCM 230 at 214. If required, it then calls DCM 230 via logic block 224 to release a specified number of expanded storage pages at logic blocks 232 and 234. This would typically be accomplished by releasing the least recently used (LRU) set of pages. The pages are then placed in the available pool at 240.

Figure 4B:
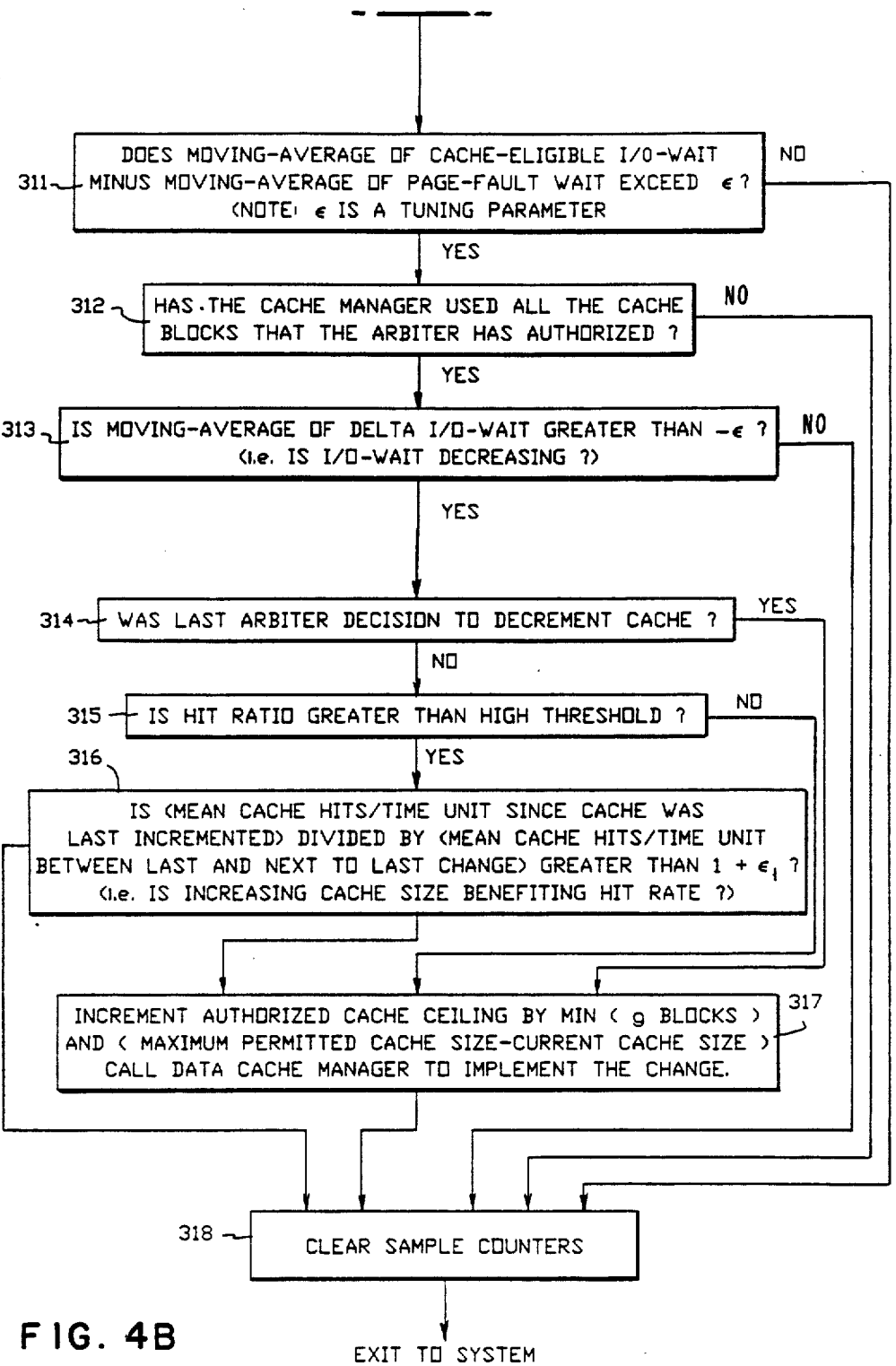

FIGS. 4A and 4B depict in greater detail the logic used by ARB 220 when it is cyclically entered.

If there are no tasks in the system currently waiting for a resource (logic block 300) then control is passed to logic block 307 to determine if it is time to make an arbiter decision. Otherwise all of the waiting tasks (logic blocks 301–306) are inspected. At step 301 the next task is inspected followed by step 302 which determines if the task is in cache-eligible I/O wait. If it is, the next step is 303 in which 1 is added to the I/O counter and program execution is then transferred to step 306. If at step 302 a determination is made that the task is not in cache-eligible I/O wait, execution continues at logic block 304 at which it is determined if the task is in virtual page fault wait. If it is not execution continues at 306, if it is, at logic block 305 the page-wait counter is incremented by 1, and then execution continues at 306. Logic block 306 determines if there is another waiting task. If so, control returns to logic block 301, and if not execution continues at step 307.

After the sampling of wait states is completed, control passes to logic block 307 to decide whether an ARB decision should be made.

An ARB decision interval consists of n sampling intervals, where n is an ARB tuning parameter. If n sampling intervals have not yet occurred then ARB exits to the operating system. Otherwise, it is time for an ARB decision and processing continues at logic block 308 where the mean sample wait values for the ARB decision interval are computed. These intervals are 1) mean cache-eligible I/O wait = (interval samples for this state)/n and 2) mean page-fault wait = (interval samples for this state)/n. Next the moving averages of the last k of these means is computed (logic block 309).

Note that k is an ARB tuning parameter that tradesoff potential data cache size oscillation frequency and sensitivity to sudden change. A small value of k (e.g., 1) makes ARB sensitive to short-term fluctuations in state samples. As a increases in size, ARB is less sensitive to short-term fluctuations but may also respond less rapidly to significant shifts in demand for expanded storage.

At logic block 310, the mean cache-eligible I/O wait for the previous ARB decision interval is subtracted from the value for this interval. This gives a signed real number which shows the trend of cache-eligible I/O wait. This is called the delta I/O wait.

Next, at logic block 311, the moving average of the mean page-fault wait is subtracted from the moving average of the mean cache-eligible I/O wait. The result is compared to $\epsilon$ which is a small, real number chosen to avoid ARB decisions when there is no meaningful difference in the sample values. It can be changed to tune the algorithm.

If the result does not exceed $\epsilon$, indicating that cache eligible I/O wait is not significantly greater than page fault wait, then control passes to logic block 318. Otherwise, at logic block 312, if DCM 230 has not yet used all the data cache blocks previously authorized, control passes to logic block 318.

If the current data cache size is equal to the authorized ceiling, the moving average of delta I/0 wait is compared to $-\epsilon$ (logic block 313). If the moving average of delta I/O wait is not greater, then the cache-eligible I/O wait is decreasing significantly, and control passes to logic block 318. If cache-eligible I/O wait is not decreasing significantly, and the last ARB decision was to reduce the size of the data cache (logic block 314), then control passes to logic block 317 in order to increment the size of the data cache.

If the last decision was to increment the data cache size, then further checks are made to ensure that continued benefit is being gained by increasing the size of the data cache. First the data cache hit ratio is checked against a threshold (logic block 315). If it is not higher than this threshold, indicating from empirical evidence that higher hit ratios should normally be obtainable, then control passes to logic block 317 to increment the size of the data cache.

If the hit ratio is higher, then, at logic block 316, a threshold is indicated, based on empirical evidence, that there may not be more value to be gained by incrementing the size of the data cache. In order to determine if this is the case, the cache hit rate since the last decision to increment the data cache is divided by the cache hit rate of the preceding cache size change interval. If the quotient exceeds $1.0 + \epsilon_1$ then there is continuing benefit and control passes to logic block 317 to increment the size of the data cache. Note that $\epsilon_1$ is a tuning parameter. It indicates whether a significant improvement in the data cache hit rate has occurred.

At logic block 317 the data cache authorized ceiling is incremented by the smaller of g blocks and the amount which the current cache ceiling is under the maximum permitted cache ceiling. Both g and the maximum permitted cache ceiling are system dependent and can be determined during system initialization. Usually the maximum permitted size is the number of blocks of expanded storage that are available and g is a number of blocks that represents a reasonable increment of the cache without being a significant fraction of its maximum possible size. A typical value of g in an expanded storage environment is 2048.

If increasing cache size does not benefit the hit rate control passes to logic block 318. At logic block 318 the ARB sample counters are cleared for the next interval and control is passed back to the operating system.

Figure 5:
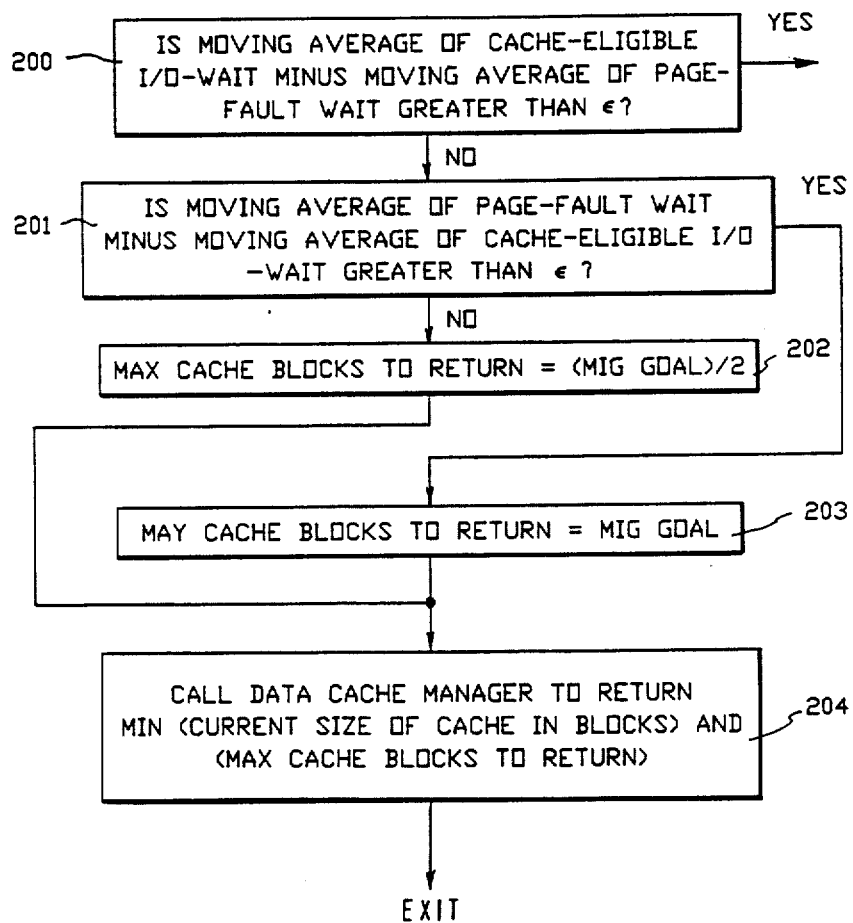

FIG. 5 depicts the logic used to decide whether or not to decrement the size of the data cache when page migration is invoked. At logic block 400 the moving average of page-fault wait is subtracted from the moving average of cache-eligible I/0 wait. If the result exceeds $\epsilon$ then cache-eligible I/0 wait dominates and control is passed to the caller (i.e., the routine exits). If the moving average of page fault wait exceeds the moving average of cache-eligible I/0 wait by $\epsilon$ (logic block 401) then the maximum data cache blocks that will be returned is set to the MIG goal (logic block 403). Otherwise, the difference between the two wait states is not significant and the maximum data cache blocks that will be returned is set to one-half of the the MIG goal (logic block 402). At logic block 404 the data cache is decremented by the smaller of the computed size (at logic block 402 or 403) and the current number of blocks in use by the data cache. Control is then passed to the caller.

While the invention has been described in its preferred embodiments, it is to be understood changes in form and details of the above description may be made without departing from the scope and spirit of the invention.

I claim:

1. In a computer system having a processor, an operating system for said processor and processor storage for control by said operating system and wherein a portion of said processor storage acts as a data cache for said operating system, the improvement wherein said portion of processor storage acting as a data cache is variable in size and wherein said computer system further comprises:
   first means for monitoring the demand made for data cache service by tasks running on said processor under said operating system;
   second means for monitoring the demand made for processor storage service other than data cache service by said tasks; and
   third means responsive to said first and second means for varying the size of said portion of processor storage acting as a data cache so as to balance said demand for data cache service with said demand for other processor storage service.

2. The improvement defined in claim 1 wherein:
   said first means periodically determines the number of said tasks in a waiting state as a result of a cache miss;
   said second means periodically determines the number of said tasks waiting for processor storage service other than as a result of a cache miss; and
   said third means periodically compares the average number of tasks determined by said first means with the average number of tasks determined by said second means and if said averages are not changing in a direction which tends to make them equal, adjusts said size of said portion of processor storage acting as a data cache in a direction which tends to make said averages equal to each other.

3. The improvement defined in claim 2 wherein said size is adjusted repeatedly in the same direction only for so long as the sum of said averages tends to be reduced thereby.

4. The improvement defined in claim 2, and further comprising:
   means for determining the number of cache hits and the cache hit ratio which occurs between the periodic comparisons by said third means,
   said third means not increasing the size of said portion of processor storage acting as a data cache if the cache hit ratio is above a threshold and the number of cache hits does not increase along with an increase in the size of said portion.

5. The improvement defined in claim 1 wherein:
   said first means periodically determines a measure of the average length of time that a task must wait as a result of a cache miss;
   said second means periodically determines a measure of the average length of time that a task must wait for processor storage service other than as a result of a cache miss; and
   said third means periodically compares said measure determined by said first means with said measure determined by said second mean and if said measures are not changing in a direction which tends to make them equal, adjusts the portion of processor storage acting as a data cache in a direction which tends to make them equal.

6. The improvement defined in claim 1 wherein said processor storage comprises a main memory portion and an expanded storage portion.

7. The improvement defined in claim 6 wherein said portion of processor storage acting as a data cache is within said expanded storage portion.

8. The improvement defined in claim 7 wherein:
   said second means monitors the demand made for expanded storage service by tasks running on said processor under said operating system; and
   said third means varies the size of said portion of expanded storage acting as a data cache so as to balance the demand for data cache service with the demand for other expanded storage service.

9. The improvement defined in claim 7 wherein:
   said first means determines a measure of the average length of time that a task running on said processor must wait when said task has a data cache miss;
   said second means determines a measure of the average length of time that a task running on said processor must wait when said task has a virtual page fault, a virtual page fault arising when a task seeks access to a virtual page which must first be brought into said main memory portion; and
   said third means periodically compares said measure determined by said first means with said measure determined by said second means and if said measures are not changing in a direction which tends to make them equal, adjusts said portion of expanded storage acting as a data cache in a direction which tends to make said measure equal.

* * * * *